United States Patent [19]
Krishnakumar et al.

[11] Patent Number: 6,014,087
[45] Date of Patent: *Jan. 11, 2000

[54] VARIABLE CONTENTION TRANSMISSION MEDIA ACCESS BASED ON IDLE WAITING TIME

[75] Inventors: Anjur Sundaresan Krishnakumar, Bussum, Netherlands; Joao Luis Sobrinho, Lisbon, Portugal

[73] Assignee: Lucent Techologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/792,327

[22] Filed: Jan. 31, 1997

Related U.S. Application Data

[60] Provisional application No. 60/011,599, Mar. 8, 1996.
[51] Int. Cl.$^7$ .................................................. G06F 13/376
[52] U.S. Cl. ........................... 340/825.5; 455/1; 370/455; 370/461; 370/447; 370/462
[58] Field of Search ............................ 340/285.5, 825.51; 455/1; 370/431, 455, 461, 503, 447, 450, 462, 458; 1/1

[56] References Cited

U.S. PATENT DOCUMENTS

| | | | |
|---|---|---|---|
| 4,701,909 | 10/1987 | Kavehrad et al. | 340/825.5 X |
| 5,319,642 | 6/1994 | Ota | 370/447 |
| 5,535,212 | 7/1996 | Koopman et al. | 370/455 |
| 5,568,476 | 10/1996 | Sherer et al. | 370/447 X |

OTHER PUBLICATIONS

"A Simulation–Based Comparison of Voice Transmission on CSMA/CD Networks and on Token Buses" J.D. DeTreville, AT&T Bell Laboratories Technical Journal, vol. 63, No. 1, Jan. 1984, pp. 33–55.

"Comparative Performance of Voice/Data Local Area Networks" T. A. Gonsalves, et al., IEEE Journal on Selected Areas in Communications, vol. 7, No. 5, Jun. 1989, pp. 657–669.

"A Variation on CSMA/CD That Yields Movable TDM Slots in Integrated Voice/Data Local Networks", N. F. Maxemchuk, Bell System Technical Journal, vol. 61, No. 7, Sep. 1982, pp. 1527–1550.

"Voice and Data on a CATV Network", N. F. Maxemchuk et al., IEEE Journal on Selected Areas in Communications, vol. SAC–3, No. 2, Mar. 1985, pp. 300–311.

"Voice and Data Transmission Over an 802.11 Wireless Network", M. A. Visser et al., International Symposium on Personal, Indoor and Mobile Radio Communications, Sep. 1995, pp. 648–652.

"Packet Voice Communications Over PC–Based Local Area Networks", E. Friedman, et al., IEEE Journal on Selected Areas in Communications, vol. 7, No. 2, Feb. 1989, pp. 211–218.

"Performance of CSMA/CD Networks Under Combined Voice and Data Loads", G. J. Nutt et al.,IEEE Transactions on Communications, vol. COM–30, No. 1, Jan. 1982, pp. 6–11.

"Carrier Sense Multiple Access with Message–Based Priority Functions", F. A. Tobagi, IEEE Transactions on Communications, vol. COM–30, No. 1, Jan. 1982, pp. 185–200.

*Primary Examiner*—Michael Horabik
*Assistant Examiner*—William H. Wilson, Jr.

[57] ABSTRACT

A facility having particular data to transmit over a transmission medium, contends for access to the medium by transmitting a jamming signal over the transmission medium for a particular duration of time that is a small fraction of the amount of time that the facility had to thus far wait to so contend. If the transmission medium is found to be idle at the expiration of that time, then the facility accesses the medium. Otherwise, the facility waits until the transmission medium again becomes idle and then re-contends for access.

21 Claims, 3 Drawing Sheets

VARIABLE CONTENTION TRANSMISSION MEDIA ACCESS BASED ON IDLE WAITING TIME

CROSS-REFERENCE TO RELATED APPLICATION

This application claims priority of Provisional Application Serial No. 60/011,599 which was filed Mar. 8, 1996.

FIELD OF THE INVENTION

The invention relates to a contention scheme for access to a transmission medium.

BACKGROUND OF THE INVENTION

The Institute of Electrical and Electronic Engineers is completing a proposed standard designated 802.11 for wireless LANs. The standard recommends a Carrier Sense Multiple Access (CSMA) protocol with Collision Avoidance (CSMANCA) as the LAN access protocol. The CSMA/CA protocol was developed primarily for data applications, and, therefore, is not well-suited for voice applications. The proposed 802.11 standard specifies that a so-called "point coordination function", i.e., a centralized protocol, may potentially support voice communications. We have recognized, however, that the point coordination function suffers from a number of problems, mainly from the fact that it is centralized. In particular, the centralized function (a) requires an access point to have good propagation conditions with all of the other stations and (b) cannot operate well in an environment with more than one cell.

SUMMARY OF THE INVENTION

The relevant art is advanced and the foregoing problems are dealt with by providing a facility which contends for access to a shared transmission medium by transmitting a contention ("jamming") signal over the medium for a particular duration of time determined as a function of the amount of time that the facility had to wait for the transmission medium to become idle, and then accessing the medium for data transmission if it is again found to be idle following the termination of such transmission. If the medium is not idle following the termination of the contention signal—meaning that another facility whose wait was longer is still transmitting its contention signal—then the facility monitors the transmission medium for the next idle state and once again transmits the contention signal. However, in this instance the duration of such transmission will increase as a result of an increase in amount of time that the facility had to wait to access the transmission facility.

These and other aspects of the claimed invention will be readily apparent from the ensuing detailed description.

DETAILED DESCRIPTION

Figure 1:
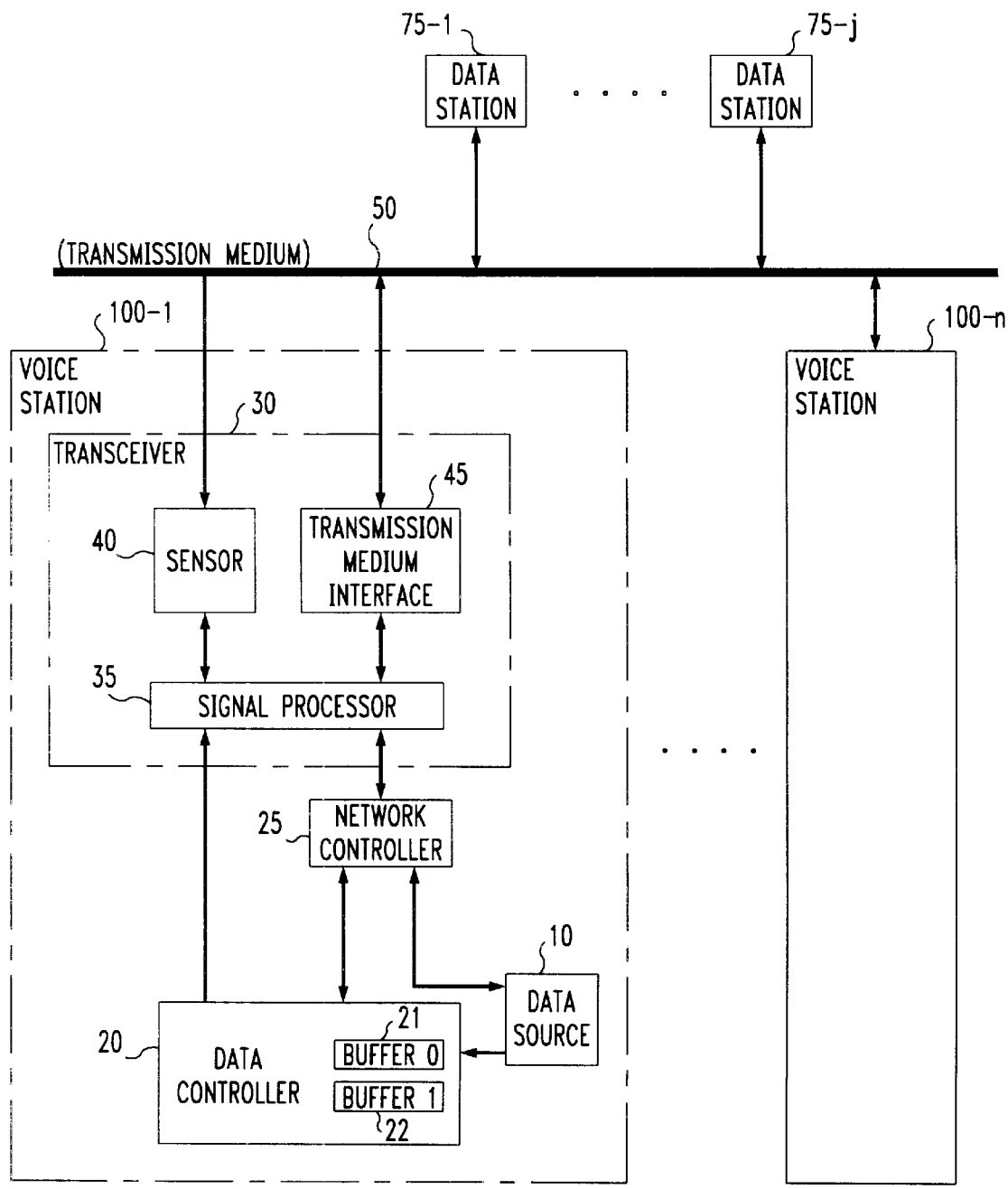
FIG. 1 is a broad block diagram of a system in which the principles of the invention may be practiced.

For the sake of clarity, the claimed invention will be discussed in the context of a wireless system. It is to be understood, however, that should not be taken as a limitation since the claimed invention is also suited for a wired environment. In that case, transmission medium 50, FIG. 1, would represent a wired system, e.g., a wired Local Area Network (LAN), and each of the data stations 75-1 through 75-j as well as voice stations 100-1 through 100-n would include suitable circuitry for interfacing with the wired system.

With the foregoing in mind, any one of the voice stations 100-1 through 100-n may transmit voice information to another voice station by first contending for access to transmission medium 50. When a voice station is "granted" access to medium 50 as a result of such contending, then the voice station may transmit a voice packet over medium 50 to the other voice station. It is well understood that the transmission of voice signals cannot be unduly delayed and any such delay needs to be somewhat constant so that the flow of the reproduced voice signals at the receiver will be as natural as possible. Otherwise, the reproduced flow will be inadequate (i.e., "choppy"). Such constant delay is provided as close as possible in accordance with the principles of the invention.

Specifically, a voice station includes, inter alia, (a) transceiver 30 which interfaces a voice station with transmission medium 50, (b) network controller 25 which controls such contention and transmission of voice signals, (c) data source/application 10 which receives voice signals from a user (not shown), and (d) data controller 20 which stores voice signals received from data source/application 10 in one of a plurality of data buffers (e.g., one of two data buffers). Data controller 20 thereafter at the direction of network controller 25 supplies data to transceiver 30 for transmission over wireless medium 50. Transceiver 30, more particularly, includes signal processor 35, sensor 40 and transmission medium interface 45. In a wireless system, interface 45 converts the digital signals forming a packet into analog signals and then modulates the analog signals using a carrier signal suitable for the associated wireless system. The modulated signals are then transmitted over the air via an associated power amplifier coupled to an antenna (not shown). (In a wired system, interface 45 would transmit data packets that it receives from signal processor 35 to medium 50.)

Sensor 40, on the other hand, accepts signals from medium 50 when requested to do so by signal processor 35 and passes the accepted signals to signal processor 35. Signal processor 35 then performs a conventional energy calculation on the received signals, and compares the result of the calculation with a predetermined threshold level, e.g., a threshold level of, for example, −76 dBm for an average transmitted power of 100 mW. If the result of the calculation meets or exceeds the threshold, then signal processor 35 concludes that the medium is occupied; otherwise it is unoccupied. If the medium is perceived to be unoccupied for a predetermined interval of time, then it is deemed to be idle. Three such interval of times are used in an illustrative embodiment of the invention and are respectively designated $t_{med}$, $t_{obs}$ and $t_{long}$ corresponding to intervals of, for example, 20 microseconds, 15 microseconds and 40 microseconds, respectively. (It is evident from the latter statement that $t_{obs} < t_{med} < t_{long}$. Also, since $t_{long}$ is used in connection with conventional data procedures it will not be discussed herein.) If the result of the calculation is less than the threshold, then the transmission medium is perceived to be idle and network controller 25 is notified accordingly.

In an illustrative embodiment of the invention, data controller 20, which may be a conventional microprocessor, includes two data buffers 21 and 22 which are operated in a so-called ping-pong fashion. That is, during a particular medium 50 access cycle, voice signals are stored in one buffer and voice signals stored in the other buffer during a previous access cycle are read out and supplied to signal processor 35 for delivery to the intended destination via medium 50. Thus, voice data/signals that are being received from an associated voice application illustrated in FIG. 1 as data source 10 during the current access cycle are stored in one of the buffers, e.g., buffer 21, while the voice signals that were stored in the other one of the buffers, e.g., buffer 22, are read out and supplied to signal processor 35. During the next medium 50 access cycle, voice signals are stored in buffer 22 and read out of buffer 21, as will be discussed again below.

(It is noted that the above and following description of the way in which voice station 100-1 operates equally pertains to the other voice stations)

Voice station 100-1 invokes a procedure to establish a connection between itself and another voice station 100-i responsive to receipt of a request to do so from the associated voice application, e.g., data source 10.

Data source 10 enters such a request by sending a message to network controller 25 requesting the connection and containing the identity of the other voice station. Responsive to receipt of the message, network controller 25 invokes a program which directs the establishment of the connection via medium 50. Controller 25 thereafter contends for access to medium 50 so that voice signals that are stored in one of the data buffers may be supplied to the other voice station via the established connection, in which such contention is performed in accordance with the principles of the invention.

Figure 2:
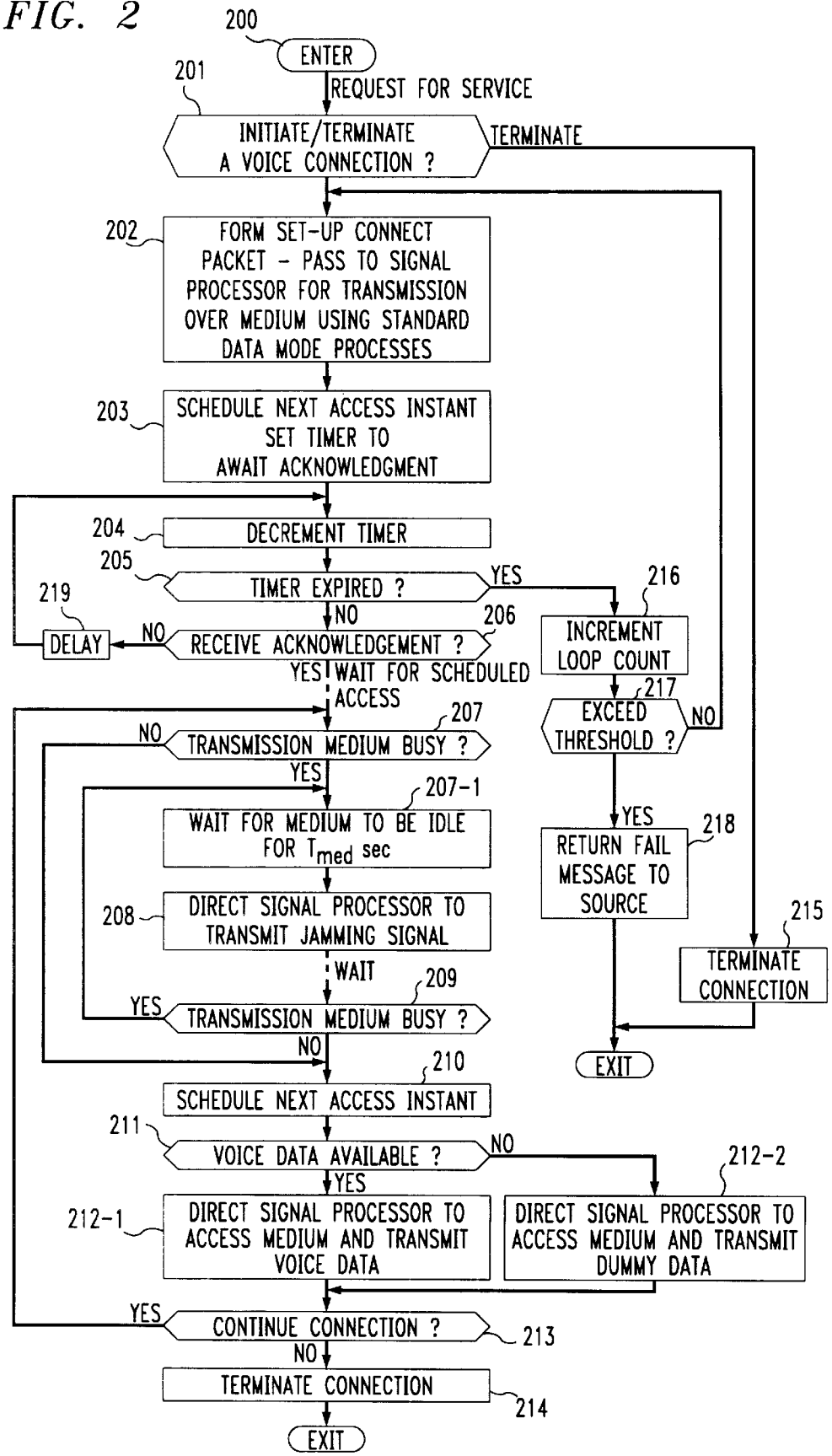
FIG. 2 illustrates in flow chart form a program which implements the principles of the invention in a network controller of FIG. 1.

Network controller 25, more specifically, enters the program of FIG. 2 upon receipt of the aforementioned request, in which controller 25 operating under the control of the program determines (block 201) if the received message is a request to initiate or terminate a connection. If the latter, then controller 25 (block 215) terminates the medium 50 connection in a conventional manner and then exits. If the former, then controller 25 forms a conventional connection setup message and in conjunction with signal processor 35. Invokes a conventional data mode suited for establishing a connection over medium 50. That is, for a wireless facility 50, network controller 25 invokes the procedure used by that facility to establish the requested connection. If, on the other hand, medium 50 is a wired facility, e.g., the well-known Ethernet, then the procedures used by that facility to establish a connection re invoked. In addition, network controller 25 schedules (block 203) what we call an access instant to occur at a specific time in the immediate future at which point controller 25 enters a bid to access medium 50. Network controller 25 also sets a counter that is used as a timer to time for the receipt of an acknowledgment from the other voice station acknowledging the connection. Network controller 25 (block 204) then decrements the counter/timer and checks (block 205) to see if the timer has expired. If not, then controller 25 checks (block 206) to see if the aforementioned acknowledgment has been received. If the acknowledgment has not been received, then the program waits (block 219) for an appropriate period of time, e.g., 1 millisecond, and then returns to decrement (block 204) the counter/timer.

If the counter reaches zero (times out) before an acknowledgment is received then network controller 25 (block 216) increments a loop counter to track the number of times it attempted to establish the requested connection and waited for receipt of an acknowledgment from the other voice station. In an illustrative embodiment of the invention, network controller 25 makes three attempts to establish the connection and then quits. Thus, when the loop count reaches a value of four (block 217), then network controller 25 (block 218) forms a message indicating that the attempt to establish the requested connection failed and supplies the message to the requesting application, e.g., source 10. The program operating on Network controller 25 then exits. If network controller 25 (block 217) finds that the count is less than four, then it repeats (block 202) the call set-up procedure and scheduling of the next access instant.

If an acknowledgment is received, then network controller 25 waits for the access instant, at which time network controller 25 checks the status of medium 50 as provided by signal processor 35. (As noted above, signal processor 35 tracks the status of medium 50 by comparing the level of power in a sample of a signal that sensor 40 acquires from medium 50 to a predetermined threshold value. If the level is below (above) the threshold, then medium 50 is considered to be idle (busy). Signal processor 35 then notifies network controller 25 of the status of medium 50.) If the transmission medium is idle for $t_{med}$ seconds, then the program (block 207) running on network controller 25 proceeds to block 210. If medium 50 is otherwise busy, then network controller 25 (block 207-1) waits for medium 50 to become idle. At that point, network controller 25 then directs (block 208) signal processor 35 to initiate the contention process for access to medium 50 by transmitting, in accord with an aspect of the invention, a so-called "jamming" signal over medium 50 for an amount of time that is a small fraction of (proportional to) the amount of time that network controller 25 had to wait so far to access medium 50, starting from the entry of the current access instant. The former amount of time may be determined using a proportionality constant selected in accordance with the teaching disclosed in the article "Distributed a Multiple Access Procedures to Provide Voice Communications over IEEE 802.11 Wireless Networks," by J. L. Sobrinho and A. S. Krishnakumar, 1996 IEEE Global Telecommunications Conference, pp. 1689–1694, London, November 1996, which is hereby incorporated by reference.

Network controller 25, more particularly, uses the latter time to track the amount of the time that the jamming (or contention) signal will be transmitted over medium 50, in accord with an aspect of the invention. At the end of that period of time, network controller 25 directs signal processor 35 to terminate the transmission of the jamming signal. Network controller 25 (block 209) again checks the status of wireless medium as reported by signal processor 35. If medium 50 is busy (block 209), which indicates that another station is still transmitting its jamming signal—meaning that the other station had waited a longer amount of time than voice station 100-1 to access medium 50—, then network controller 25 returns to block 207-1 to again wait for medium 50 to become idle for $t_{med}$ seconds. It is noted that another pass through block 207-1 increases the amount of time that network controller 25 has to wait for medium 50 to become idle. The increased time is thus added to the initial wait time so that the interval of time that the jamming signal is transmitted over medium 50 (block 208) increases proportionately—meaning that it is likely that network controller 25 (station 100-1) will, at that point, win the contention for medium 50. Thus, in accord with an aspect of the invention, access to medium 50 is granted to the station that transmits the jamming signal for the longest period of time.

(It is noted that the jamming signal is also referred to herein as a contention signal or "black burst".)

If transmission medium 50 is otherwise idle (block 209), then network controller 25 schedules (block 210) its next access instant and then checks (block 211) to see if voice data is available for transmission over medium 50. If not, then network controller 25 (block 212-2) directs signal processor 35 to transmit so-called dummy data over medium 50. If so, then network controller 25 (block 211) directs data controller 20 to start unloading the appropriate one of its buffers, e.g., buffer 21, and pass the voice signal data to signal processor 35. At that point, controller 20 starts loading voice signals that it receives from source 10 into the other buffer, e.g., buffer 22. Controller 20 continues to load such signals in the latter buffer until it is directed to unload the buffer and pass the signals to signal processor 35. Similarly, data controller 20 concurrently designates the buffer already unloaded, buffer 21, as the buffer that will be used to store the next voice signals received from source 10. Network controller 25 also directs signal processor 35 to transmit the signals that it receives from data controller 10 over medium 50 in the manner discussed above. When the buffer has been unloaded and all such signals have been transmitted over medium 50 via the aforementioned connection, then network controller 25 (block 213) checks to see if the connection should be continued and returns to block 207 if that is the case. Otherwise, network controller 25 (block 214) terminates the connection in a conventional manner and then exits.

Figure 3A:
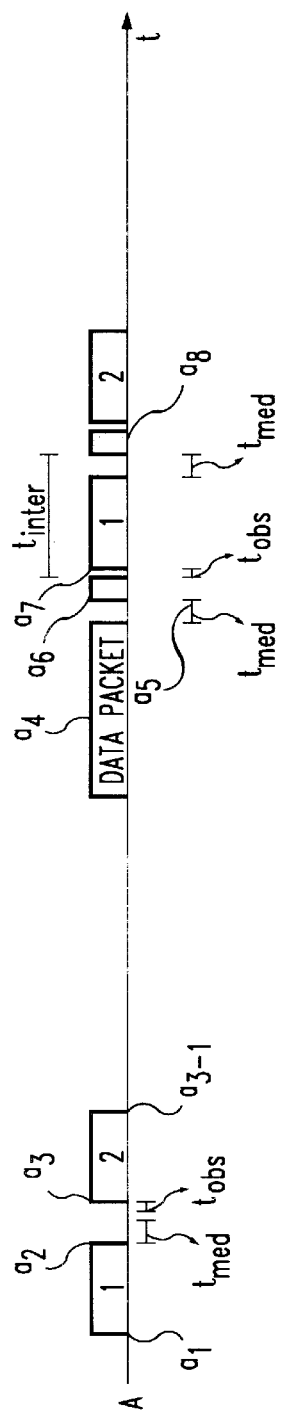
FIGS. 3a, 3b, and 3c are time sequence diagrams useful in understanding various aspects of the invention.
Figure 3B:
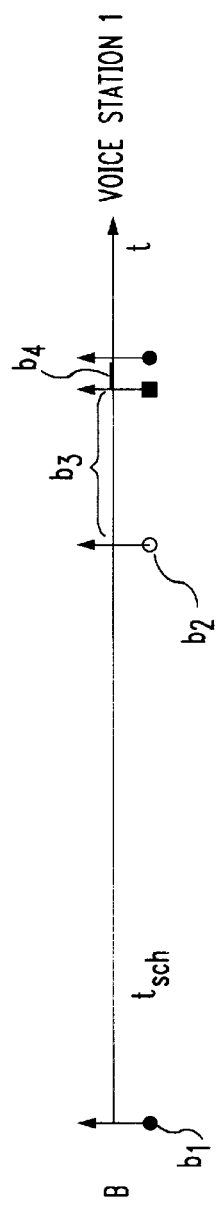
Figure 3C:
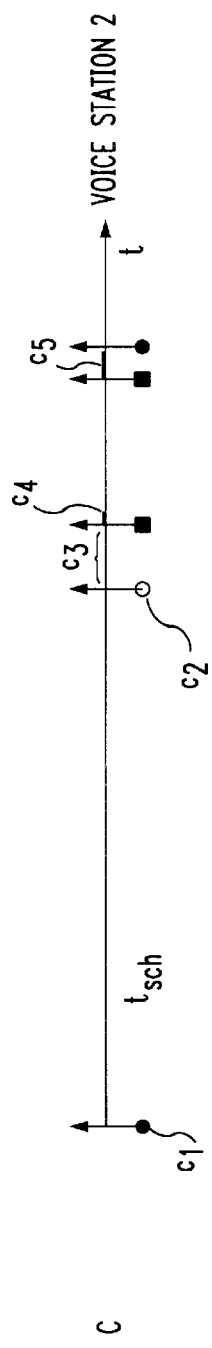
Figure 3D:
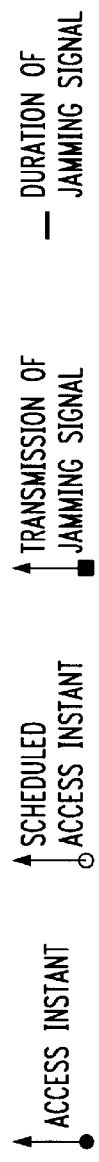
FIG. 3d defines particular symbols shown in FIGS. 3a, 3b and 3c.

Timing diagrams illustrating the foregoing are shown in FIGS. 3a to 3c, in which an arrow with a circle, filled-in circle or filled-in square (FIG. 3d) respectively represents a scheduled access instant, access instant, or transmission of a jamming signal. A heavy solid line represents the duration of a transmitted jamming signal. Assume that at time b1 station 1 associated with time line B is granted an access instant and begins to transmit (a1) all of the voice data that it collected up to that point over transmission medium 50 as described above. In addition, station 1 schedules its next access instant (entry) to occur $t_{sch}$ seconds in the future. Assume that station 1 completes its transmission of voice data at time a2 and that station 2 upon determining that medium 50 is idle for $t_{obs}$ seconds after the scheduled access instant, transmits its data over medium 50, which is completed at time a3–1. Station 2 also schedules its next access instant.

It is seen that the next scheduled access instant for station 1 occurs at b2, at which time, station 1 determines that medium 50 is busy as a result of the transmission of a data packet during a4 by another station. Accordingly, as discussed above, station 1 continues to monitor medium 50. When medium 50 becomes idle, station 1 checks medium 50 to see if it remains idle for $t_{med}$ seconds, e.g., 20 microseconds, (a5). Station 1 then transmits a jamming signal for duration a6/b4. At the end of that duration, station 1 terminates its transmission of the jamming signal and then waits $t_{obs}$ seconds. Station 1 then checks medium 50 to see if it is idle. If so, then station 1 is granted its access instant (a7) and begins to transmit voice data that it accumulated starting from the last access instant to the present access instant.

Note that the scheduled access instant for station 2 occurred at c2. Similarly, at that point station 2 also found that medium 50 was busy and then began monitoring medium 50. It is seen that station 2 also contends for access to medium 50 by transmitting a jamming signal over medium 50 as shown at c4. However, since the amount of time (c3) that station 2 has to wait for medium 50 to become idle is less than the amount of time (b3) that station 1 has to wait, station 2 transmits its black burst over medium for a shorter duration of time, as shown by comparing c4 with b4. Accordingly, station 2 will find medium 50 busy when it terminates its transmission of the black burst, and, therefore, continues to wait for medium 50 to once again be idle for $t_{med}$ seconds. When station 1 ends its transmission of data thereby allowing medium 50 to become idle, station 2 waits $t_{med}$ seconds and then again transmits a black burst to contend for access to medium 50. However, the duration of the jamming signal (c5/a8) is longer than the previous duration (c4) to account for the additional amount of time that station 2 had to wait to again contend for access to medium 50.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method for contending for access to a transmission medium comprising the steps of,
    (a1) initiating an access entry,
    (a2) monitoring the transmission medium to determine when it is idle,
    (b) responsive to a determination that the transmission medium is not idle, waiting for the transmission medium to become idle, then transmitting a contention signal over said transmission medium for a period of time proportional to an amount of time that elapsed between the access entry and the determination that the transmission medium was idle, and
    (c) at the expiration of the period of time, terminating the transmission of the contention signal and then determining if the transmission medium is idle,
    (d) if the transmission medium is determined to be not idle, then repeat steps (a2), (b) and (c), otherwise, accessing the transmission medium.

2. The method of claim 1 further comprising the steps of
    (e) transmitting the data over the transmission medium, and then scheduling an access entry, and
    (f) proceeding to step (a2).

3. The method of claim 2 wherein step (e) includes the step of transmitting dummy data over the transmission medium if there is an absence of said data.

4. The method of claim 1 wherein the step of accessing the transmission medium includes the steps of
    (d1) transmitting over the transmission medium data that has been accumulated since the last access of the transmission medium, and
    (d2) scheduling a next access entry.

5. The method of claim 1 wherein the step of monitoring includes the step of responsive to a determination that the transmission medium is idle, accessing the medium.

6. A method of arbitrating access to a transmission medium associated with a communications system, said method comprising the steps of
    entering an access entry and if the transmission medium is not idle, waiting for the medium to become idle,
    when the medium becomes idle, transmitting a jamming signal over the transmission medium for a period of time proportional to an amount of time that elapsed between the access entry to a determination that the transmission medium is idle, and
    accessing the transmission medium if the transmission medium is found to be idle at the expiration of the period of time and transmitting data over the transmission medium.

7. The method of claim 6 further comprising the step of responsive to being entered for the purpose of transmitting the data over the transmission medium, monitoring the transmission medium to determine when it is idle.

8. The method of claim 7 further comprising the steps of transmitting the data over the transmission medium, and then scheduling an next access entry, and proceeding to the step of monitoring the transmission medium.

9. The method of claim 8 further comprising the step of responsive to an absence of data to be transmitted, transmitting dummy data over the transmission medium.

10. The method of claim 6 wherein the step of accessing the transmission medium includes the steps of scheduling a next access entry, and transmitting over the transmission medium the data that has been accumulated since the last access of the transmission medium.

11. The method of claim 6 further comprising the step of accessing the transmission medium if said determination indicates that the transmission medium is idle.

12. An arrangement for contending for access to a transmission medium comprising, first apparatus, operative following a scheduled access entry and responsive to the transmission medium becoming idle, for transmitting a contention signal over the transmission medium for a period of time, in which the period of time is determined as a function of the amount of time that the first apparatus has to wait for the transmission medium to become idle starting from the scheduled access entry, and second apparatus, responsive to the transmission medium being idle at the expiration of the period of time, for then accessing the transmission medium, and responsive to the transmission medium not being idle at the expiration of the particular period of time, for then monitoring the transmission medium for the next time it becomes idle.

13. The contention arrangement of claim 12 wherein the transmission medium is a wireless medium.

14. The arrangement of claim 13 wherein the apparatus for accessing the transmission medium includes a mechanism that, responsive to an absence of data to be transmitted, transmits dummy data over the transmission medium.

15. The arrangement of claim 12 further comprising a scheduling mechanism that, responsive to the transmission of data over the transmission medium, schedules an access entry, and then initiates the monitoring the transmission medium.

16. The arrangement of claim 15 wherein the first apparatus includes a mechanism that sets the period of time for transmitting the contention signal to a value that is proportional to an amount of time that elapsed from the access entry to the determination that the transmission medium is idle.

17. The arrangement of claim 12 wherein the second apparatus includes a mechanism that transmits over the transmission medium data that has been accumulated since the last time it accessed the transmission medium, and schedules a next access entry.

18. A system for arbitrating access to a transmission medium within a communication system comprising a transmitter that transmits a jamming signal over the transmission medium for a period of time determined as a function of the amount of time that the transmitter had to wait for the transmission medium to become idle, and apparatus that accesses the transmission medium if the transmission medium is found to be idle at the expiration of the particular duration of time and then transmits data over the transmission medium.

19. A method for contending for access to a transmission medium comprising the steps of (a) monitoring the transmission medium to determine when it is idle, (b) responsive to a determination that the transmission medium is busy, waiting for the transmission medium to become idle, then transmitting a contention signal over said transmission medium for a period of time proportional to the waiting time, and (c) at the expiration of the period of time, terminating the transmission of the contention signal and then determining if the transmission medium is idle, (d) if the transmission medium is determined to be still busy, then repeat steps (a), (b) and (c), otherwise, accessing the transmission medium.

20. An arrangement for contending for access to a transmission medium comprising, first apparatus, operative following a scheduled access entry and responsive to the transmission medium becoming idle, for causing a contention signal to be transmitted over the transmission medium for a period of time proportional to the amount of time that the first apparatus had to wait for the transmission medium to become idle, and second apparatus, responsive to the transmission medium being idle at the expiration of the period of time, for then accessing the transmission medium, and responsive to the transmission medium not being idle at the expiration of the period of time, for then monitoring the transmission medium for the next time it becomes idle.

21. A system for arbitrating access to a transmission medium within a communication system comprising transmitter means, responsive to a request to access the transmission medium and a determination that the transmission medium is idle, for transmitting a jamming signal over the transmission medium for a period of time that is based on the amount of time that the transmitter had to wait for the transmission medium to become idle, and apparatus operative for accessing the transmission medium if the transmission medium is found to be idle at the expiration of the period of time and then transmitting data over the transmission medium.

* * * * *